US008432252B2

(12) United States Patent
Setlak et al.

(10) Patent No.: US 8,432,252 B2
(45) Date of Patent: Apr. 30, 2013

(54) FINGER SENSOR HAVING REMOTE WEB BASED NOTIFICATIONS

(75) Inventors: Dale R. Setlak, Melbourne, FL (US); John David McKinney, Palm Bay, FL (US); Thomas Aebli, Melbourne, FL (US); Stephanie Griffin, Melbourne Beach, FL (US)

(73) Assignee: Authentec, Inc., Melbourne, FL (US)

( * ) Notice: Subject to any disclaimer, the term of this patent is extended or adjusted under 35 U.S.C. 154(b) by 743 days.

(21) Appl. No.: 12/488,116

(22) Filed: Jun. 19, 2009

(65) Prior Publication Data
US 2010/0321158 A1    Dec. 23, 2010

(51) Int. Cl.
| | |
|---|---|
| G05B 19/00 | (2006.01) |
| G05B 23/00 | (2006.01) |
| G08B 1/08 | (2006.01) |
| G06K 7/10 | (2006.01) |
| G06K 5/00 | (2006.01) |
| G06K 9/00 | (2006.01) |
| H04M 1/66 | (2006.01) |

(52) U.S. Cl.
USPC ..... 340/5.83; 340/5.53; 340/5.52; 340/539.1; 235/462.46; 235/380; 382/115; 382/124; 382/321; 455/411

(58) Field of Classification Search ............ 340/5.83, 340/572.1, 572.4, 572.5, 988, 10.1, 10.2, 340/10.3, 10.31, 10.4, 10.41, 10.42, 825.69, 340/825.71, 825.73, 825.31, 825.72, 539, 340/825.32, 10.5, 5.61, 5.72, 5.53, 5.81, 340/825.34, 5.82; 382/100, 115, 306, 127, 382/126, 116, 119, 120, 121, 123, 25, 203; 902/25, 3, 4, 5, 7; 379/88.2, 88.19, 88.21, 379/93.03, 118, 207.13
See application file for complete search history.

(56) References Cited

U.S. PATENT DOCUMENTS

| | | | | |
|---|---|---|---|---|
| 5,483,601 | A * | 1/1996 | Faulkner | 382/115 |
| 5,953,441 | A | 9/1999 | Setlak | 982/124 |
| 6,002,331 | A * | 12/1999 | Laor | 340/539.1 |
| 6,289,114 | B1 | 9/2001 | Mainguet | 382/124 |
| 6,628,810 | B1 * | 9/2003 | Harkin | 382/116 |
| 6,765,470 | B2 * | 7/2004 | Shinzaki | 340/5.52 |
| 6,867,850 | B2 | 3/2005 | McClurg et al. | 356/71 |
| 7,088,220 | B2 | 8/2006 | Kotzin | 340/5.82 |
| 7,091,845 | B2 * | 8/2006 | Midland et al. | 340/500 |
| 7,200,288 | B2 | 4/2007 | Ogura | 382/321 |
| 7,274,808 | B2 | 9/2007 | Baharav et al. | 382/124 |

(Continued)

FOREIGN PATENT DOCUMENTS

WO    2009/031140    3/2009

OTHER PUBLICATIONS

Document #: SOF-OPME30-UG-1.0, Softex OmniPass Mobile Edition Ver. 3.0, Users' Guide; 2003-2005 by Softex Incorporated.

*Primary Examiner* — Jennifer Mehmood
*Assistant Examiner* — Mirza Alam
(74) *Attorney, Agent, or Firm* — Allen, Dyer, Doppelt, Milbrath & Gilchrist, P.A.

(57) ABSTRACT

An electronic device may include a housing and a finger biometric sensing area exposed on the housing. The electronic device may also include an optical indicator at least partially surrounding the finger biometric sensing area and exposed on the housing. The electronic device may also include a controller for performing at least one function based upon the finger biometric sensing area, and activating the optical indicator based upon communications with a remote web site.

25 Claims, 11 Drawing Sheets

U.S. PATENT DOCUMENTS

| | | | |
|---|---|---|---|
| 7,308,122 B2 | 12/2007 | McClurg et al. | 382/124 |
| 7,361,919 B2 | 4/2008 | Setlak | 250/556 |
| 7,788,500 B2 * | 8/2010 | Okamura et al. | 713/186 |
| 2002/0052192 A1 * | 5/2002 | Yamazaki et al. | 455/411 |
| 2002/0089410 A1 * | 7/2002 | Janiak et al. | 340/5.53 |
| 2002/0188854 A1 | 12/2002 | Heaven et al. | 713/186 |
| 2003/0078991 A1 | 4/2003 | Harris | 709/218 |
| 2004/0165753 A1 * | 8/2004 | Takhiri et al. | 382/115 |
| 2004/0208348 A1 | 10/2004 | Baharav et al. | 382/124 |
| 2005/0063571 A1 | 3/2005 | Setlak | 382/124 |
| 2005/0108166 A1 | 5/2005 | Colley | 705/44 |
| 2005/0129292 A1 * | 6/2005 | Morgeneier et al. | 382/124 |
| 2005/0169503 A1 | 8/2005 | Howell et al. | 382/115 |
| 2005/0199727 A1 * | 9/2005 | Schmidt et al. | 235/462.46 |
| 2006/0034492 A1 * | 2/2006 | Siegel et al. | 382/115 |
| 2006/0181521 A1 | 8/2006 | Perreaultl et al. | 345/173 |
| 2006/0210120 A1 * | 9/2006 | Rowe et al. | 382/115 |
| 2006/0280346 A1 | 12/2006 | Machida | 382/124 |
| 2007/0133847 A1 | 6/2007 | Ogura | 382/126 |
| 2007/0273658 A1 | 11/2007 | Yli-Nokari et al. | 345/173 |
| 2008/0049988 A1 | 2/2008 | Basile et al. | 382/124 |
| 2008/0082451 A1 | 4/2008 | Schneider et al. | 705/64 |
| 2008/0095412 A1 | 4/2008 | Fujieda et al. | 382/124 |
| 2008/0180408 A1 | 7/2008 | Forstall et al. | 345/177 |
| 2008/0220752 A1 | 9/2008 | Forstall et al. | 455/415 |
| 2009/0166411 A1 | 7/2009 | Kramer et al. | 235/382 |
| 2009/0169071 A1 | 7/2009 | Bond et al. | 382/124 |

* cited by examiner

FINGER SENSOR HAVING REMOTE WEB BASED NOTIFICATIONS

FIELD OF THE INVENTION

The present invention relates to biometric sensing, and, more particularly, to an electronic device having a finger biometric sensor and related methods.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,953,441 to Setlak and assigned to the assignee of the present invention. The fingerprint sensor is an integrated circuit sensor that drives the user's finger with an electric field signal and senses the electric field with an array of electric field sensing pixels on the integrated circuit substrate.

U.S. Pat. No. 6,289,114 to Mainguet discloses a fingerprint sensor that includes a finger sensing integrated circuit (IC). The finger sensing IC includes a layer of piezoelectric or pyroelectric material placed between upper and lower electrodes to provide electric signals representative of an image of the ridges and valleys of the fingerprint.

A particularly advantageous approach to multi-biometric fingerprint sensing is disclosed in U.S. Pat. No. 7,361,919 to Setlak, which is assigned to the assignee of the present invention and is incorporated in its entirety by reference. The Setlak patent discloses a multi-biometric finger sensor sensing different biometric characteristics of a user's finger that have different matching selectivities.

As portable electronic devices become increasingly smaller in size, space within each portable electronic device is becoming limited for including additional hardware features. For example, fingerprint sensors are becoming increasingly popular for use within an electronic device, and in particular within a portable electronic device or a mobile wireless communications device, such as a cellular telephone, where space may be limited. Moreover, including a fingerprint sensor in a portable electronic device may increase the overall device footprint. Additionally, as the use of a fingerprint sensor in a portable electronic device becomes increasingly popular, it may be desirable to include additional features.

One particular approach is disclosed in U.S. Patent Application Publication No. 2006/0181521 to Perreault et al., which discloses a system for dynamically illuminating sensors. A dynamic illuminator is positioned next to a contact surface of a touch sensor and is used to display a status of the touch sensor.

Another approach is disclosed in U.S. Patent Application Publication No. 2007/0133847 to Ogura. Ogura discloses an image input device and includes a light guide that covers infrared light emitting diodes surrounding the periphery of a light sensor. The light guide guides emitted light to a finger placed on the light sensor.

Another approach is disclosed in U.S. Patent Application Publication No. 2005/0169503 to Howell et al. Howell et al. discloses a device performing a task associated with fingerprint data. Fingerprint data is read and matched to stored fingerprint data. The stored fingerprint data is associated with a particular task, which may include one or more steps. The particular task is then performed. For example, tasks may include (1) the execution of an inherent function of an electronic device, such as copying on a photocopier; (2) the launching of a program, such as a Web browser, e-mail program, or electronic calculator, that is not specific or inherent to a particular electronic device, including interactive programs; (3) any performance of one or more steps on the electronic device to perform any operation; or (4) any combination or permutation of the above. Different fingers on a user's hand may correspond to different tasks. Additionally, an LED can blink to signal the user of an acceptable scanned finger image.

Softex Omnipass Mobile Edition, available from Softex, Inc. of Austin, Tex., discloses a program for creating an authentication for an enrolled user based on a sensed fingerprint. When the user visits a website that requires authentication for the first time, the user will provide a corresponding username and password. Upon a subsequent visit to the same website, the user can provide his sensed fingerprint and his username and password will be provided to the website.

SUMMARY OF THE INVENTION

In view of the foregoing, it is therefore an object of the present invention to provide an electronic device that includes a finger biometric sensor that is relatively compact in size, and provides additional user convenience.

This and other objects, features, and advantages in accordance with the present invention are provided by an electronic device that may include a housing and a finger biometric sensing area exposed on the housing. The electronic device may also include an optical indicator at least partially surrounding the finger biometric sensing area and exposed on the housing, for example. The electronic device may also include a controller for performing at least one function based upon the finger biometric sensing area and activating the optical indicator based upon communications with a remote web site. Accordingly, the electronic device includes a finger biometric sensor that is relatively small or compact in size, relatively easy to install in the electronic device, and provides visual light indications based upon communications with a remote web site to thereby increase user convenience.

The controller may be for operating the optical indicator based upon a status change of the remote web site. The controller may also be for operating the optical indicator based upon a secure connection being established with the remote web site, for example. The controller may further be for operating the optical indicator based upon an identity of a user of the remote web site. The controller may cooperate with the finger biometric sensing area to perform at least one of a navigation function, an authentication function, and a program shortcut function with the remote web site, for example.

The optical indicator may include at least one visible light source, and a visible light guide optically coupled to the at least one visible light source and at least partially surrounding the finger biometric sensing area. The visible light source may generate a plurality of different colors, and may include at least one light emitting diode (LED), for example.

The electronic device may further include an integrated circuit (IC) substrate having an upper portion defining the finger biometric sensing area. The controller may include at least some circuitry on the IC substrate, for example. The controller may further include at least some circuitry external from the IC substrate. The electronic device may further include a display carried by the housing, for example.

Another aspect is directed to a method of making an electronic device including positioning an optical indicator to partially surround the finger biometric and be exposed on a housing. The method may also include configuring a controller within the housing for performing at least one function based upon the finger biometric sensing area. The method may also include configuring the controller for activating the optical indicator based upon communications with a remote web site.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
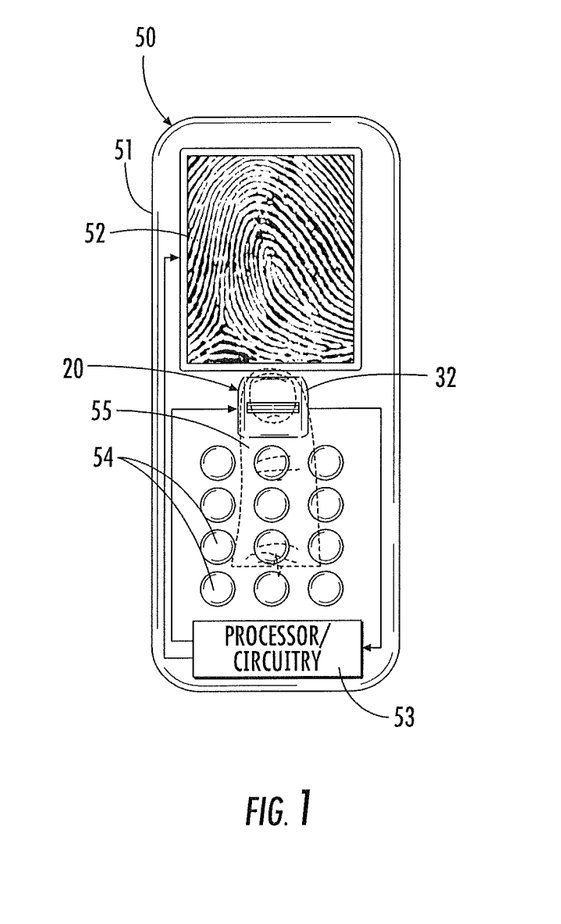
FIG. 1 is a schematic plan view of a cellular telephone including a finger sensor assembly in accordance with the present invention.

Referring initially to FIG. 1, an embodiment of a finger sensor assembly 20 in accordance with the present invention is now described. The finger sensor assembly 20 is illustratively mounted on an exposed surface of a cellular telephone 50. Of course, the finger sensor assembly 20 can also be used other portable and stationary electronic devices as well.

The cellular phone 50 includes a housing 51, a display 52 carried by the housing, and processor/operating circuitry 53 also carried by the housing and connected to the display and to the finger sensor assembly 20. An array of input keys 54 are also provided and used for conventional cellphone dialing and other applications as will be appreciated by those skilled in the art.

Figure 2:
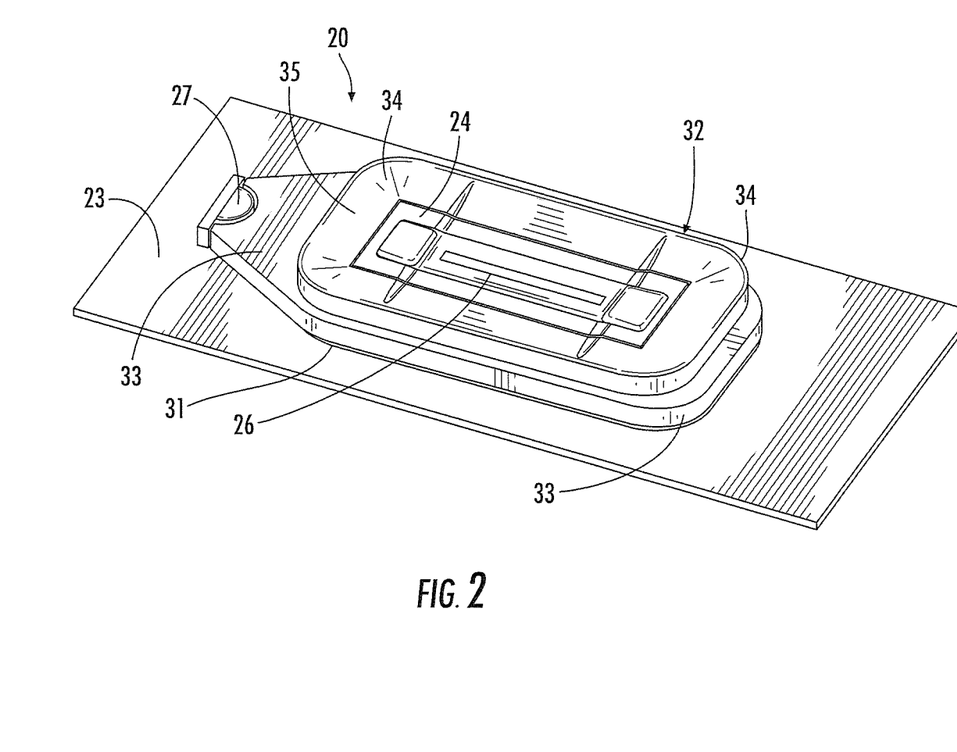
FIG. 2 is a perspective view of the finger sensor assembly of FIG. 1.
Figure 3:
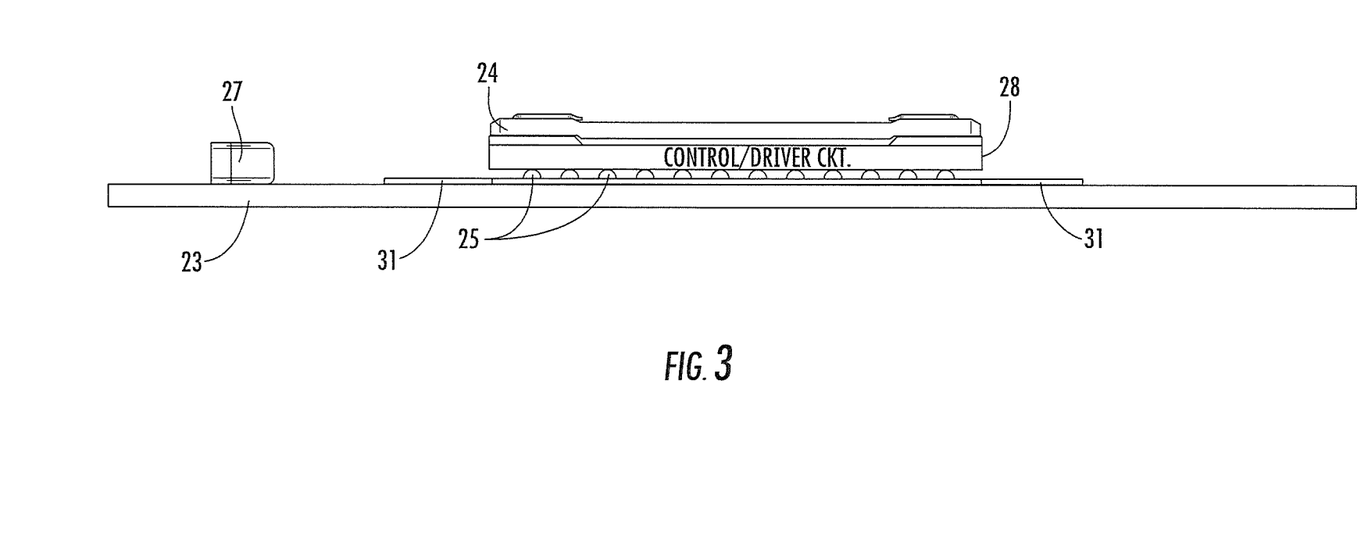
FIG. 3 is a side view of a portion of the finger sensor assembly of FIG. 1.
Figure 4:
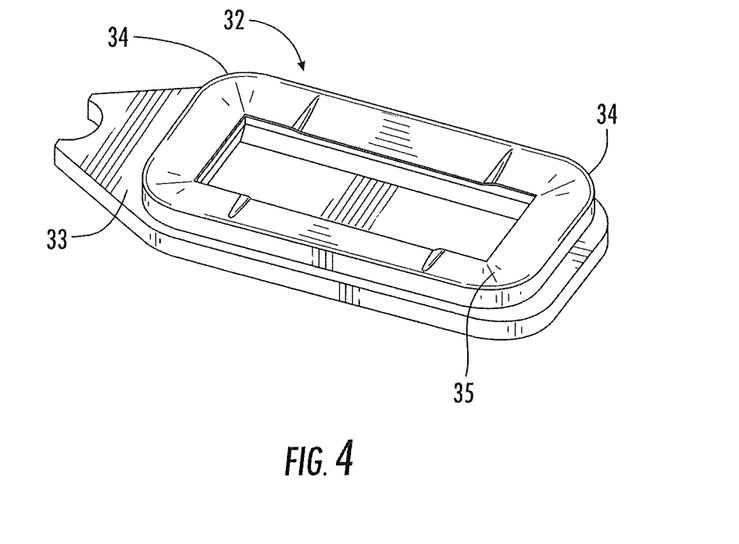
FIG. 4 is a perspective view of the light guide of the finger sensor assembly of FIG. 3.

Referring additionally to FIGS. 2-4, the finger sensor assembly 20 includes a circuit board 23, and an integrated circuit (IC) finger sensor grid array package 24 mounted on the circuit board. The IC finger sensor grid array package 24 illustratively includes a ball grid array 25 on a lower end thereof mounted to the circuit board 23, and a finger sensing area 26 on the upper end thereof. The ball grid array 25 advantageously provides increased ease in assembly and integration. For example, the use of the ball grid array 25 allows the finger sensor package to be readily and quickly installed, and, thus, production and assembly costs are reduced. As will be appreciated by those skilled in the art, other grid arrays may be included in the IC finger sensor grid package 24, such as a land grid array, for example.

The IC finger sensor grid array package 24 is illustratively a slide type finger sensor, for example where the user's finger 55 slides over the sensing area 26 to generate a sequence of finger images. Alternatively, the finger sensor IC finger sensor grid array package 24 could be of the static placement type, where the user simply places his finger 55 onto the sensing surface to generate a finger image. Other types of sensors may be used, as will be appreciated by those skilled in the art, for example as disclosed in multi-biometric fingerprint sensing is disclosed in U.S. Pat. No. 7,361,919 to Setlak, which is assigned to the assignee of the present invention and is incorporated in its entirety by reference.

Additionally, the finger biometric sensing area 26 may also include an array of electric field sensing electrodes (not shown). Capacitive and/or thermal sensing pixels may also be used, for example.

The finger sensor assembly 20 further includes a visible light emitting diode (LED) 27 that is multicolor and coupled to the circuit board 23. For example, a single red, green, and blue multicolor LED may be used. The multicolor LED 27 is also advantageously a standard size commercially available multicolor LED, which allows a reduced production cost. In other embodiments the visible LED 27 may be a single color LED. Other visible light sources may be used, as will be appreciated by those skilled in the art. The multicolor LED 27 generates visible light in a lateral direction parallel to the circuit board 23 to uniformly illuminate the area around the IC finger sensor grid array package 24.

Control/driver circuitry 28 included on the IC finger sensor ball grid array package 24 may drive the multicolor LED 27 based upon a status of the IC finger sensor ball grid array package. In other embodiments, the control/driver circuitry 28 may be located outside the IC finger sensor ball grid array package 24 and operate in cooperation with the processor/circuitry 53 to provide other functionality, as will be appreciated by those skilled in the art. The multicolor LED 27 may be driven by the circuitry 28 to illuminate green upon a successful finger sensing, illuminate red upon an unsuccessful finger sensing, illuminate blue in a ready to sense state, or not illuminate at all in an off state, for example. Other colors may be used to represent a given status. In embodiments where the visible LED 27 is a single color LED, the control/driver circuitry 28 may drive it to an on state upon a successful finger sensing.

In some embodiments, the control/driver circuitry 28 may include LED drivers to provide control of the illumination. The LED drivers may include three independent channels, where each LED driver is a constant current sink with four programmable current levels. Independent switch control of each LED driver and its current level advantageously allows a large variety of colors and integrated optical functionality, for example, fading, and sensor feedback. The duty cycle value may be re-mapped to an exponential curve to compensate for perceived light intensity.

In some embodiments, the control/driver circuitry 28 may also include a universal serial bus (USB) clock recovery function. The USB clock recovery advantageously reduces the need for an external crystal and components. For example, the IC finger sensor grid array package 24 may use an internal clock, and thus no external components may be desirable, as the internal clock may be calibrated to 48.000 MHz+/−XXX % using a frame signal timing that is produced by a USB host controller every 1 mS. Current limiting may be included in the control/driver circuitry 28 for physical damage protection, and an integrated 1.8-volt regulator may also be included in the circuitry for current reduction of digital core circuitry, as will be appreciated by those skilled in the art. The control/driver circuitry 28 may also cooperate with an audio transducer (not shown) to provide audio feedback based on finger sensing.

An adhesive layer 31 is illustratively coupled to the circuit board 23 adjacent the lower end of the IC finger sensor grid array package 24. The adhesive layer 31 surrounds the lower end of the IC finger sensor grid array package 24 for securing the visible light guide 32 to the circuit board 23.

The visible light guide 32 is illustratively optically coupled to the visible multicolor LED 27. More particularly, the visible light guide 32 laterally surrounds the upper end of the IC finger sensor grid array package 24 to provide visual light indications, as noted above. As illustrated, the IC finger sensor grid array package 24 fits in an opening or cutout provided therein, the opening being fitted to the IC finger sensor grid array package. In other embodiments, the visible light guide 32 may only partially surround the upper end of the IC finger sensor grid array package 24.

As illustrated perhaps best in FIG. 4, the visible light guide 32 includes a base 33 adjacent the circuit board 23, and an illumination ring 34 extending upwardly from the base. The base 33 couples with the adhesive layer 31 in the area surrounding the lower end of the IC finger sensor grid array package 24. The base 33 also illustratively extends outwardly from one side of the lower end of the IC finger sensor ball grid array package 24 and optically couples with the multicolor LED 27.

The illumination ring 34 laterally surrounds the upper end of the IC finger sensor ball grid array package 24 and is fitted through the housing 51 of the cellular telephone 50. Adjacent portions of the device housing 51 advantageously rest on the base 33. This configuration advantageously reduces the amount of components and overall height of the finger sensor assembly 20.

As will be appreciated by those skilled in the art, the illumination ring 34 also has a concave upper surface 35. The concave upper surface 35 advantageously may guide a user's finger in proper placement on the finger sensing area 26.

The base 33 and the illumination ring 34 may be integrally formed as a molded unit and may be a transparent plastic manufactured using an In Mold Decorating (IMD) process. The IMD process advantageously allows for controlling the size, location, and shape of the final decorated finish of the illumination ring 34. Other materials and forming processes may be used, and the visible light guide 32 may be translucent, for example, as will be appreciated by those skilled in the art. Additionally, IMD processed surfaces of the visible light guide 32 can be metallized to control the flow of optical flux and reduce stray light. Brightness enhanced films may also be used to improve illumination.

Figure 5:
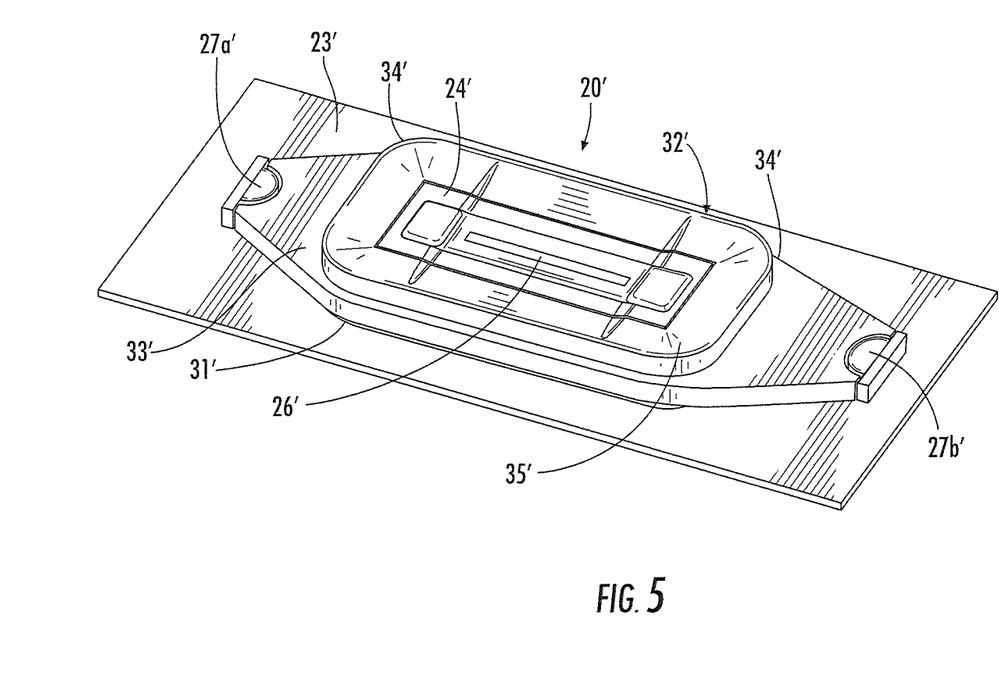
FIG. 5 is a perspective view of another embodiment of the finger sensor assembly of FIG. 2.

Referring now to FIG. 5, in another embodiment, two visible LEDs 27a', 27b' may be used at opposing ends of the finger sensor assembly 20' to provide additional visual light indications. The base 33' of the visible light guide 32' may extend outwardly from opposing ends of the finger sensor assembly 20' to couple with each of the two visible multicolor LEDS 27a', 27b'. As will be appreciated by those skilled in the art, more LEDS may be used.

Another aspect is directed to a method of making a finger sensor assembly 20. The method includes mounting an IC finger sensor grid array package 24 having a finger sensing area 26 on an upper end thereof and a grid array 25 on a lower end thereof to a circuit board 23. The method also includes coupling a visible light source 27 to the circuit board 23 to be controlled by circuitry 28 of the IC finger sensor package 24. The method also includes optically coupling a visible light guide 32 to the visible light source 27 to at least partially laterally surround the upper end of the IC finger sensor ball grid array package 24 to provide visual light indications.

Figure 6:
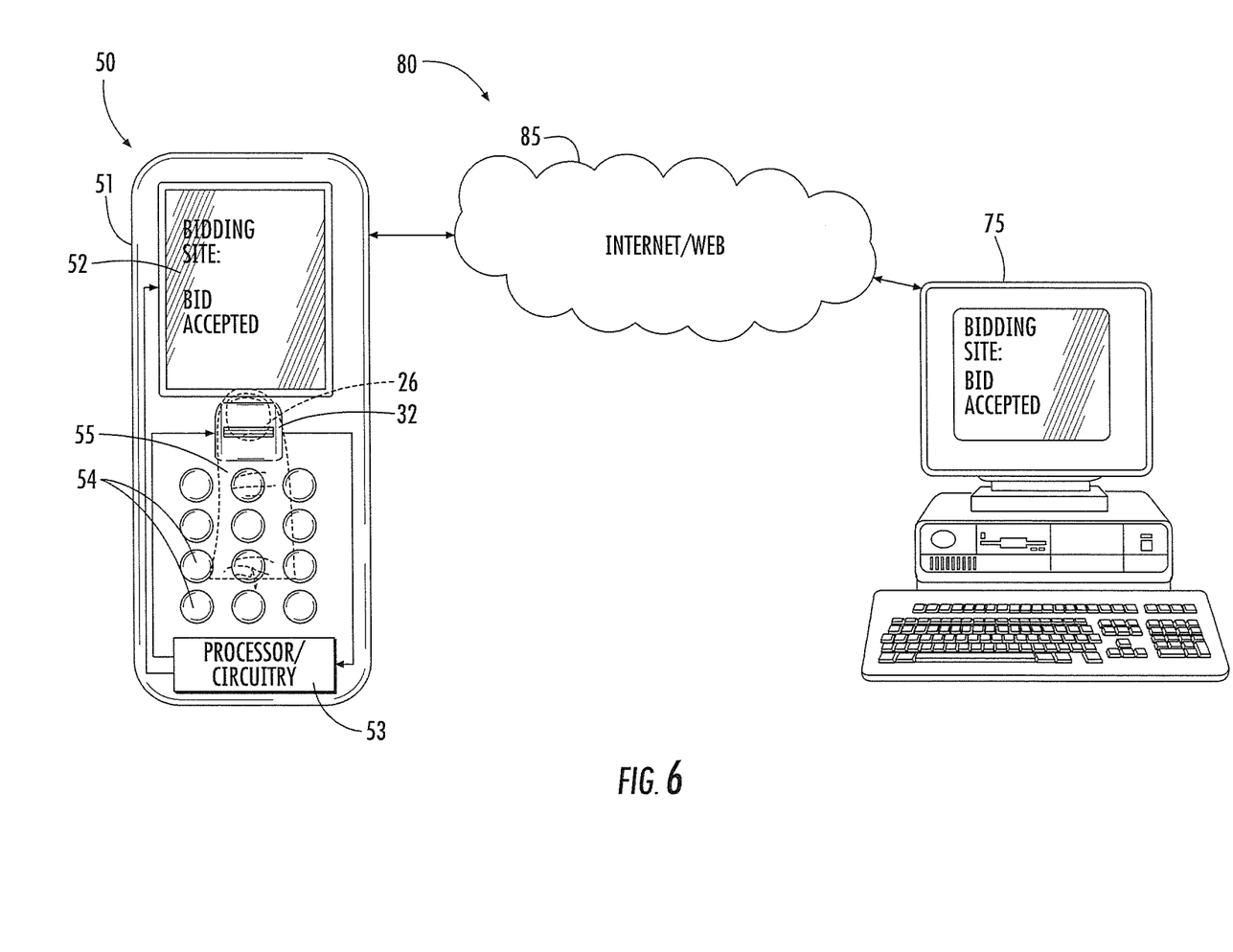
FIGS. 6-8 are schematic plan views of a communications system including the cellular telephone of FIG. 1 having its controller activate the optical indicator based upon communication with a remote web site.
Figure 7:
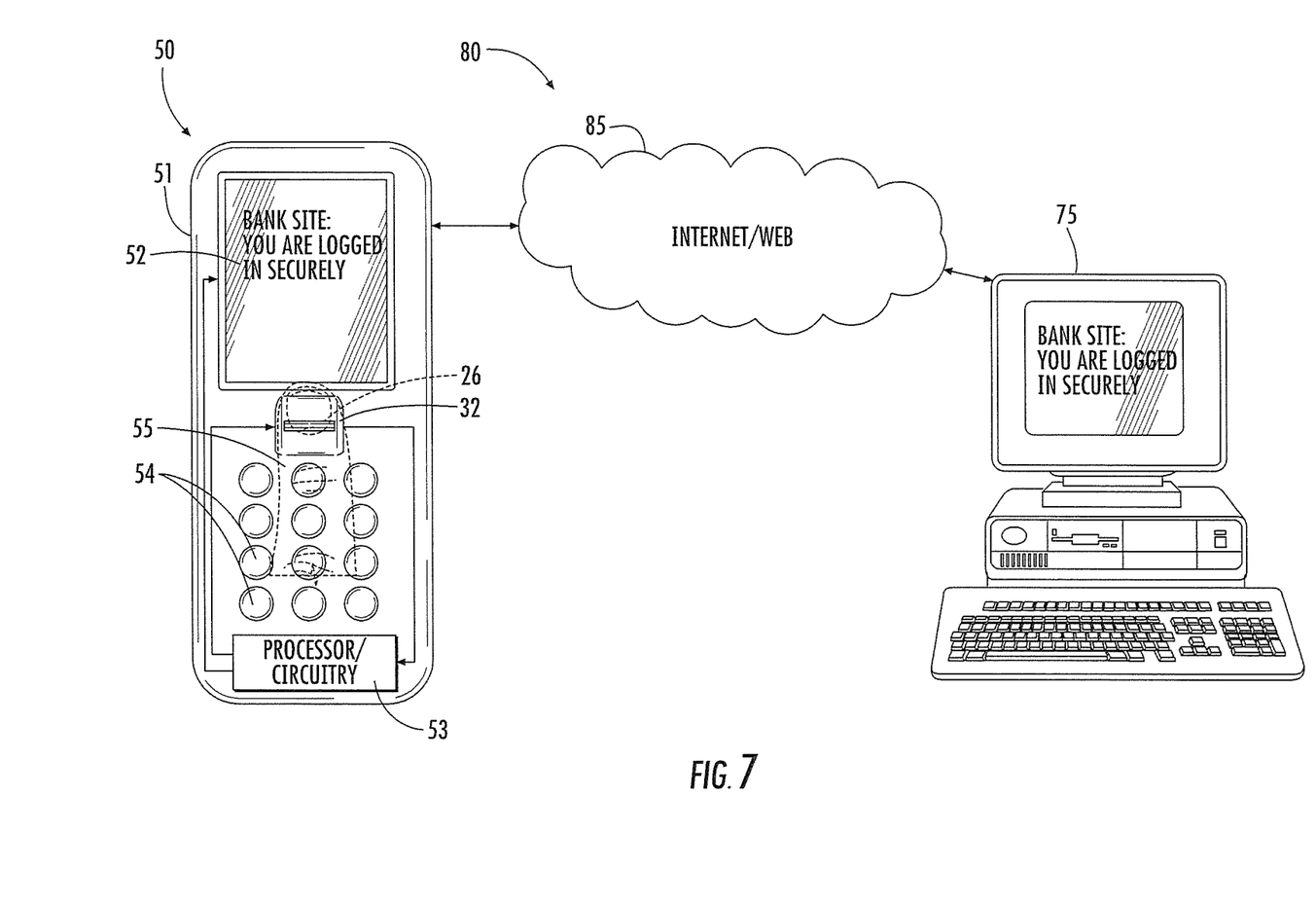
Figure 8:
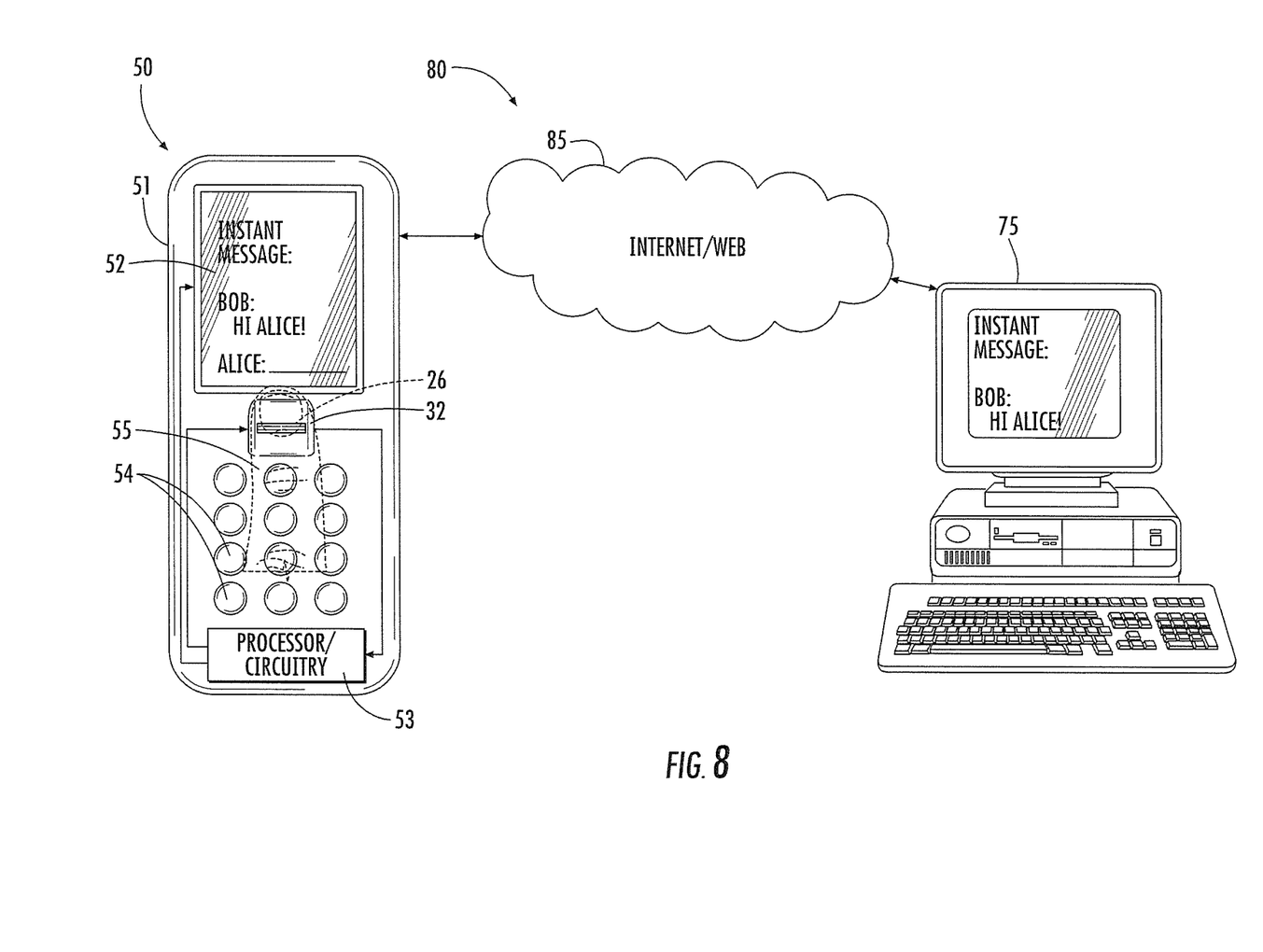

Referring now to FIGS. 6-8, a communications system 80 that includes the above-described finger sensor assembly 20 mounted on an exposed surface of the cellular telephone 50 is now described. In this embodiment, the controller (28 in FIG. 3) of the sensor assembly 20 may activate the optical indicator or illustratively in the form of the visible multicolor LED (27 in FIG. 3) and the visible light guide 32, based upon communications with a remote web site 75. Other optical indicators could be used in other embodiments. As will be appreciated by those skilled in the art, the controller may cooperate with communications circuitry (not shown) of the cellular telephone 50 to communicate with the remote web site 75 over the Internet 85.

Referring more particularly to FIG. 6, the controller may operate the visible multicolor LED to illuminate visible light guide 32 based upon a status change of the remote web site 75, for example. The controller drives the visible multicolor LED to illuminate the visible light guide 32 based upon a status change of the remote web site 75. For example, in some embodiments, the visible multicolor LED may be driven by the controller to illuminate the visible light guide 32 the color "green" upon a successful submission of a high auction bid on a remote auction bidding website as indicated on the device display 52, or illuminate the optical indicator "red" upon being outbid on the remote auction bidding website. The visible multicolor LED may flash to illuminate the visible light guide 32 "green" to indicate winning the auction on the remote auction bidding website, for example, after the time for bidding has expired. Other colors on the visible light guide 32 may be used to represent a given status of bidding on the remote auction bidding website. Additionally, other status changes on a remote web site may include successful completion of a purchase, a stock price falling below a threshold, a winning team of a sports match, and a logged in/logged out status, for example. Other types of remote web sites and statuses will be appreciated by those skilled in the art.

Referring now more particularly to FIG. 7, the controller illustratively activates the visible multicolor LED to illuminate the visible light guide based upon a secure connection being established with the remote web site 75. For example, the visible multicolor LED may be driven by the controller to illuminate the visible light guide 32 "green" upon a successful secure connection, for example, encrypted, with a remote banking website, for example. Alternatively, the multicolor LED may be driven by the controller to illuminate the visible light guide 32 "red" if the connection to the remote banking website is not secure. Other remote web sites capable of establishing a secure connection may also cooperate with the controller, as will be appreciated by those skilled in the art.

Referring now more particularly to FIG. 8, the controller illustratively activates the multicolor LED to illuminate the visible light guide 32 based upon an identity of a user of the remote web site 75. For example, the visible light guide 32 may illuminate a color corresponding to a user's contact information stored in an address book or memory (not shown) of the cellular telephone 50. In some embodiments, when an instant message is received from a user having contact information associated with the color "blue", the multicolor LED may illuminate the visible light guide 32 "blue" to indicate that an instant message has been received from that user. In other embodiments, the multicolor LED may illuminate the visible light guide 32 based upon a message posting from a particular user, for example, a posting on a social networking site.

Figure 9:
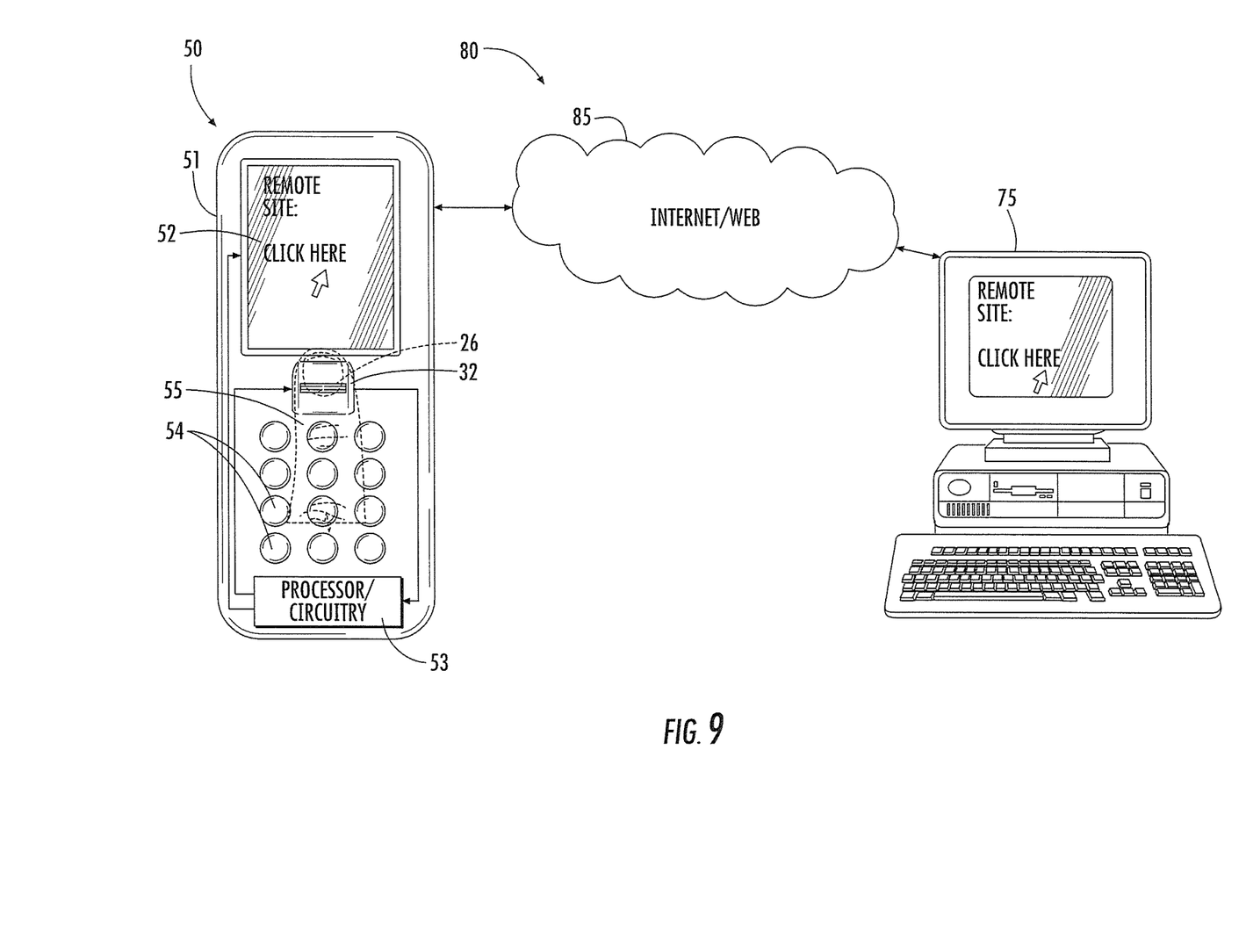
FIGS. 9-11 are schematic plan views of a communications system including the cellular telephone of FIG. 1 having its controller for performing at least one function based upon the finger biometric sensing area.
Figure 10:
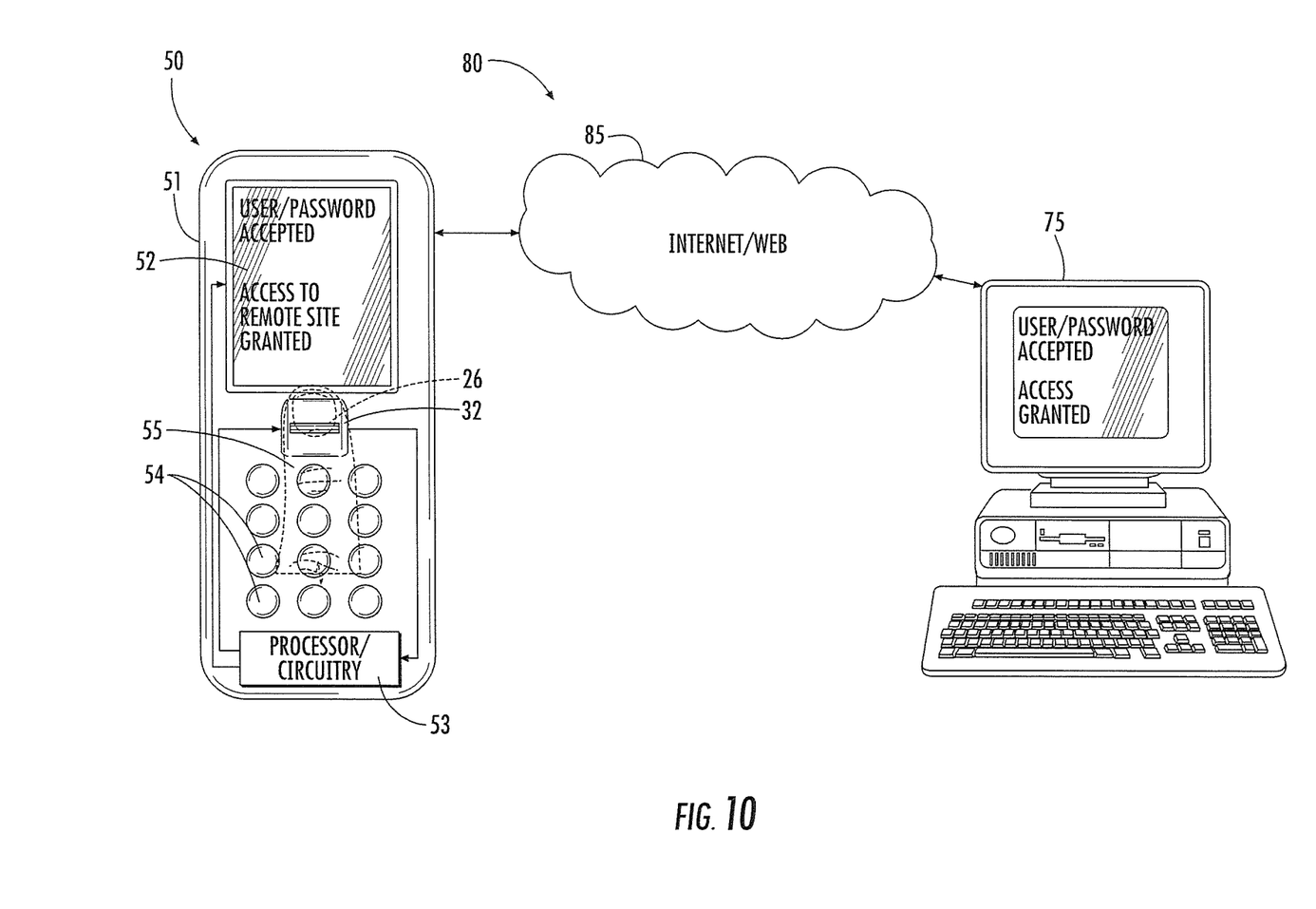
Figure 11:
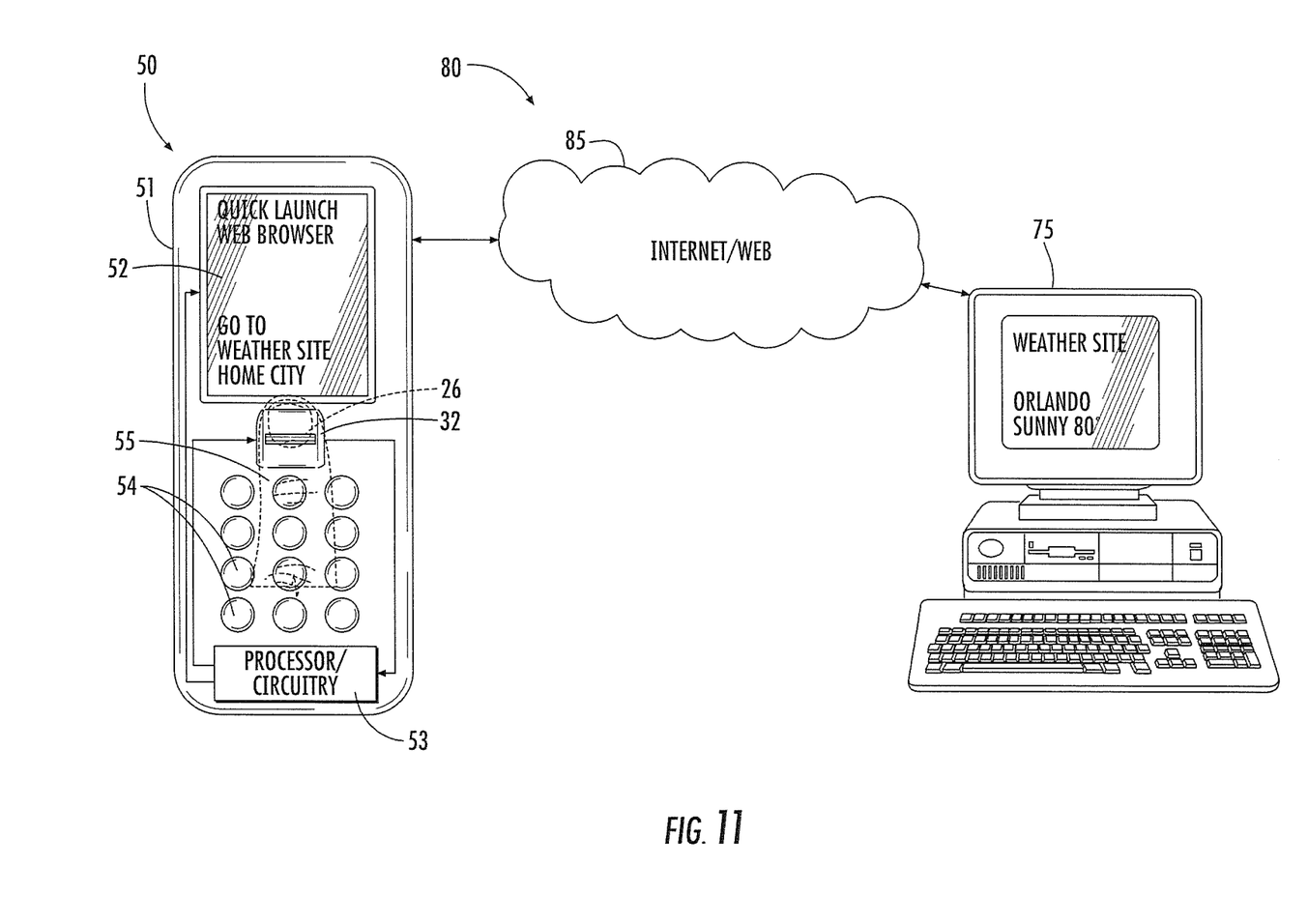

Referring now additionally to FIGS. 9-11, the controller illustratively cooperates with the sensing area 26, which may be a finger biometric sensing area, to perform a navigation function with the remote web site 75. For example, the navigation function may include selecting a menu icon or hyperlink, or moving a cursor or scrolling on the remote web site 75, as illustrated more particularly in FIG. 9.

The controller may also cooperate with the finger biometric sensing area 26 to perform an authentication function with the remote web site 75, as illustrated more particularly in FIG. 10. An authentication function with the remote web site 75 may include matching a biometric sensed from a user's finger on the finger biometric sensing area 26 to a finger biometric stored in a memory (not shown) of the cellular telephone 50. Based upon a finger biometric match, access to the remote web site 75 may be granted. For example, a finger biometric match may correspond to a username/password for the remote web site 75, for example, the remote banking site illustrated in FIG. 7.

As illustrated more particularly in FIG. 11, the controller illustratively cooperates with the finger biometric sensing area 26 to perform a program shortcut function with the remote web site 75. A program shortcut function may include execution of instructions, for example, executing a macro on the remote web site 75. The program shortcut function may also be a quick launch of an application, for example, launching of an application or a series of applications based upon sensing a user's finger 55. Advantageously, in some embodiments different finger biometrics of a user may be programmable to correspond to different applications to be launched. For example, a user's index finger may open a weather web site corresponding to a particular city, while a user's middle finger may open the weather web site corresponding to another city. The program shortcut function may also be local to the cellular telephone 50, for example. Other program shortcut functions will be appreciated by those skilled in the art.

Advantageously, the controller cooperating with the finger biometric sensing area 26 to perform a navigation function, an authentication function, and/or a program shortcut function with the remote web site 75 increases the overall ease of use of the cellular telephone 50 by reducing the amount of time to complete a task on the remote web site 75. Security may also be increased.

As will be appreciated by those skilled in the art, any of the above-noted functions of the controller may be used individually or in combination with one another. Advantageously, the controller may provide a user of the cellular telephone 50 with information about the remote web site 75 by merely glancing at the visible light guide 32. These visual indications in addition to the controller performing at least the above-noted functions based on the finger biometric sensing area 26, may increase a user's ease of use and efficiency of the cellular telephone 50, along with security.

Another aspect is directed to a method of making an electronic device. The method includes positioning an optical indicator to partially surround the finger biometric sensing area and be exposed on a housing. The method includes configuring a controller within the housing for performing at least one function based upon the finger biometric sensing area. The method further includes configuring the controller for activating the optical indicator based upon communications with a remote web site.

Configuring the controller may include configuring the controller for operating the optical indictor based upon a secure connection being established with the remote web site. Configuring the controller may also include configuring the controller for operating the optical indicator based upon an identity of a user of the remote web site. The controller may also be configured to cooperate with the finger biometric sensing area to perform at least one of a navigation function, an authentication function, and a program shortcut function with the remote web site.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a housing;
   a finger biometric sensing area exposed on said housing;
   an optical indicator at least partially surrounding said finger biometric sensing area and exposed on said housing; and
   a controller for
      performing at least one function based upon said finger biometric sensing area, and
      activating said optical indicator based upon communications with a remote web site.

2. The electronic device according to claim 1 wherein said controller is for operating said optical indicator based upon a status change of the remote web site.

3. The electronic device according to claim 1 wherein said controller is for operating said optical indicator based upon a secure connection being established with the remote web site.

4. The electronic device according to claim 1 wherein said controller is for operating said optical indicator based upon an identity of a user.

5. The electronic device according to claim 1 wherein said controller cooperates with said finger biometric sensing area to perform at least one of a navigation function, an authentication function, and a program shortcut function.

6. The electronic device according to claim 1 wherein said optical indicator comprises:
   at least one visible light source; and
   a visible light guide optically coupled to said at least one visible light source and at least partially surrounding said finger biometric sensing area.

7. The electronic device according to claim 6 wherein said at least one visible light source generates a plurality of different colors.

8. The electronic device according to claim 6 wherein said at least one visible light source comprises at least one light emitting diode (LED).

9. The electronic device according to claim 1 further comprising an integrated circuit (IC) substrate having an upper portion defining said finger biometric sensing area; and wherein said controller comprises at least some circuitry on said IC substrate.

10. The electronic device according to claim 9 wherein said controller further comprises at least some circuitry external from said IC substrate.

11. The electronic device according to claim 1 further comprising a display carried by said housing.

12. An finger sensing assembly comprising:
a finger biometric sensing area to be exposed on an electronic device;
an optical indicator at least partially surrounding said finger biometric sensing area and also to be exposed on the electronic device; and
a controller for
performing at least one function based upon said finger biometric sensing area, and
activating said optical indicator based upon communications with a remote web site.

13. The finger sensing assembly according to claim 12 wherein said controller is for operating said optical indicator based upon a status change of the remote web site.

14. The finger sensing assembly according to claim 12 wherein said controller is for operating said optical indicator based upon a secure connection being established with the remote web site.

15. The finger sensing assembly according to claim 12 wherein said controller is for operating said optical indicator based upon an identity of a user.

16. The finger sensing assembly according to claim 12 wherein said controller cooperates with said finger biometric sensing area to perform at least one of a navigation function, an authentication function, and a program shortcut function.

17. The finger sensing assembly according to claim 12 wherein said optical indicator comprises:
at least one visible light source; and
a visible light guide optically coupled to said at least one visible light source and at least partially surrounding said finger biometric sensing area.

18. The finger sensing assembly according to claim 17 wherein said at least one visible light source generates a plurality of different colors.

19. The finger sensing assembly according to claim 12 further comprising an integrated circuit (IC) substrate having an upper portion defining said finger biometric sensing area; and wherein said controller comprises at least some circuitry on said IC substrate.

20. A method of making an electronic device comprising:
positioning an optical indicator to partially surround the finger biometric and be exposed on a housing; and
configuring a controller within the housing for performing at least one function based upon the finger biometric sensing area, and
activating the optical indicator based upon communications with a remote web site.

21. The method according to claim 20 wherein configuring the controller comprises configuring the controller for operating the optical indicator based upon a status change of the remote web site.

22. The method according to claim 20 wherein configuring the controller comprises configuring the controller for operating the optical indicator based upon a secure connection being established with the remote web site.

23. The method according to claim 20 wherein configuring the controller comprises configuring the controller for operating the optical indicator based upon an identity of a user of the remote web site.

24. The method according to claim 20 wherein configuring the controller comprises configuring the controller to cooperate with the finger biometric sensing area to perform at least one of a navigation function, an authentication function, and a program shortcut function with the remote web site.

25. The method according to claim 20 wherein the optical indicator comprises:
at least one visible light source; and
a visible light guide optically coupled to the at least one visible light source to least partially surround the finger biometric sensing area.

* * * * *